(12) United States Patent
Macquet et al.

(10) Patent No.: US 10,926,897 B2
(45) Date of Patent: Feb. 23, 2021

(54) VOLUMETRIC METERING DEVICE FOR CONTAINER FILLING MACHINE

(71) Applicant: HEMA, Quimper (FR)

(72) Inventors: Philippe Macquet, Quimper (FR); Caroline Bellec, Quimper (FR); Jean-Baptiste Labasque, Quimper (FR); Erwan Ligen, Quimper (FR)

(73) Assignee: HEMA, Quimper (FR)

( * ) Notice: Subject to any disclaimer, the term of this patent is extended or adjusted under 35 U.S.C. 154(b) by 342 days.

(21) Appl. No.: 15/561,328

(22) PCT Filed: Mar. 21, 2016

(86) PCT No.: PCT/FR2016/050617
§ 371 (c)(1),
(2) Date: Jan. 22, 2018

(87) PCT Pub. No.: WO2016/151227
PCT Pub. Date: Sep. 29, 2016

(65) Prior Publication Data
US 2018/0155071 A1    Jun. 7, 2018

(30) Foreign Application Priority Data

Mar. 23, 2015    (FR) ...................................... 1552369

(51) Int. Cl.
*B65B 3/32*    (2006.01)
*B65B 37/06*    (2006.01)
(Continued)

(52) U.S. Cl.
CPC ................ *B65B 3/323* (2013.01); *B65B 3/12* (2013.01); *B65B 37/06* (2013.01); *B67C 3/204* (2013.01);
(Continued)

(58) Field of Classification Search
CPC ...... G01F 11/021; G01F 11/029; G01F 11/04; G01F 11/06; B65B 3/32; B65B 3/323
See application file for complete search history.

(56) References Cited

U.S. PATENT DOCUMENTS 3,830,264 A    8/1974 Billett et al.
3,850,345 A *  11/1974 Merritt .................... B65B 3/323
                                                        222/168.5
(Continued)

FOREIGN PATENT DOCUMENTS

EP    0379102 A1    7/1990
EP    0414075 A1    2/1991
(Continued)

OTHER PUBLICATIONS

International Search Report and Written Opinion for PCT Patent App. No. PCT/ FR2016/050617 (dated May 31, 2016) with English translation of ISR.
(Continued)

*Primary Examiner* — Timothy P. Kelly
(74) *Attorney, Agent, or Firm* — Kenealy Vaidya LLP

(57) ABSTRACT

Some embodiments relate to a metering device, including: a metering chamber; a piston separating the metering chamber into a supply compartment and a metering compartment, the piston including a passage between the two compartments; a valve for closing the passage, allowing the passage of the product when same is in the open position; and movement mechanisms of the valve. The valve includes drive mechanisms of the piston arranged on either side of the piston in such a way that the movement of the valve in a discharge direction drives the movement of the piston in the discharge direction and the movement of the valve along the length of the cylinder body in a transfer direction, and drives the movement of the piston.

16 Claims, 3 Drawing Sheets

(51) Int. Cl.
  *B65B 3/12* (2006.01)
  *G01F 15/00* (2006.01)
  *G01F 11/02* (2006.01)
  *B67C 3/20* (2006.01)
  *G01F 11/16* (2006.01)

(52) U.S. Cl.
  CPC ............ *B67C 3/206* (2013.01); *G01F 11/021* (2013.01); *G01F 11/029* (2013.01); *G01F 11/16* (2013.01); *G01F 15/005* (2013.01)

(56) References Cited

U.S. PATENT DOCUMENTS

| | | | |
|---|---|---|---|
| 3,949,791 A | | 4/1976 | Vadas |
| 5,178,304 A | * | 1/1993 | Torterotot ................. B65B 3/32 222/333 |
| 5,193,593 A | * | 3/1993 | Denis ...................... B65B 39/00 141/10 |
| 5,494,194 A | * | 2/1996 | Topper ..................... A23G 9/28 222/146.6 |
| 5,992,695 A | | 11/1999 | Start |
| 2012/0261441 A1 | | 10/2012 | van den Hoonaard |

FOREIGN PATENT DOCUMENTS

| | | |
|---|---|---|
| EP | 0379102 B1 | 12/1992 |
| FR | 2421287 A1 | 10/1979 |

OTHER PUBLICATIONS

Search Report for French Patent App. No. 1552369 (dated Nov. 9, 2015).

* cited by examiner

VOLUMETRIC METERING DEVICE FOR CONTAINER FILLING MACHINE

CROSS REFERENCE TO RELATED APPLICATION(S)

This application is a national phase filing under 35 C.F.R. § 371 of and claims priority to PCT Patent Application No. PCT/FR2016/050617, filed on Mar. 21, 2016, which claims the priority benefit under 35 U.S.C. § 119 of French Patent Application No. 1552369, filed on Mar. 23, 2015, the contents of each of which are hereby incorporated in their entireties by reference.

BACKGROUND

Some embodiments relate to a metering device for a machine for filling containers with a product. More particularly, some embodiments relate to a metering device for a container filling machine including a metering chamber with a piston, of which the piston is provided with a central opening.

Some related art container filling machines are provided with metering devices. Some of these metering devices are arranged in order to allow for a volumetric metering, in particular by way of a metering chamber. The volume of product metered to fill each container corresponds to the volume of product moved in this chamber over the length of movement of the piston in this chamber.

An example of these metering devices is disclosed in document EP0443888. In the latter, the metering chamber is formed by a cylinder body, inside of which a piston can move. At the top of this chamber is arranged an opening for the intake of the product to be metered, and at the bottom is arranged a discharge opening, through which the metered product will be expulsed from the metering chamber. This piston includes a central opening, which can be closed off or opened by a valve. During the movement of the piston upwards, the valve is in the open position, the liquid can as such pass through the opening. When enough product has been transferred between the piston and the discharge opening, the valve is closed and the piston descends, driving the discharge of the product through the discharge opening, so as to fill the container. The advantage of such a device is to allow time to be saved because the aspiration of the product in the metering chamber takes place at the same time as the discharge of the product outside of the latter.

SUMMARY

However in the device of document EP0443888, in order to coordinate the closing and the opening of the valve and the movements of the piston, the actuating mechanism of the valve and the actuating mechanism of the piston are separate. The operation is synchronised by a synchronisation device. It then follows that the system is complex and expensive to implement.

Some embodiments therefore are directed to or realize a simpler metering device, while still having a good filling rate of containers, compared to the related art.

To this effect, some embodiments are directed to a metering device for a container filling machine with a product, including:
a cylinder body defining a metering chamber, intended to be filled with the product,
a piston inside the metering chamber and separating the metering chamber into a supply compartment and a metering compartment, with the piston including a passage that communicates between the supply compartment and the metering compartment in such a way as to allow the passage of the product from one compartment to the other,
a valve for closing this passage,
movement mechanisms of the valve or movement mechanisms of the piston along the length of the cylinder body, the valve including a driver arranged on either side of the piston in such a way that the movement respectively of the valve or of the piston along the length of the cylinder body in a discharge direction drives the movement respectively of the piston or of the valve in this discharge direction and the movement respectively of the valve or of the piston along the length of the cylinder body in a transfer direction opposite the discharge direction, drives the movement respectively of the piston or of the valve in this transfer direction.

As such, the actuating of the valve in one direction or the other, will directly actuate the piston. Or alternatively, the actuating of the piston in one direction or the other will directly actuate the valve.

Therefore, only one actuating device, that which actuates the valve or that which actuates the piston, is used to actuate both the piston and the valve. No synchronisation device may be required. This system is therefore simplified and less expensive, while still having a good rate since the aspiration in the metering chamber is carried out at the same time as the metering of the product.

The realisation of the piston of the device according to some embodiments is also simplified because the valve carries the driver.

Some embodiments can include one or several of the following characteristics:
the passage of the piston is a through-hole, in particular central; this is a simple form of realisation of a passage; this also allows the product to pass more easily through this passage, in particular in the case of a liquid product including pieces, for example a sauce with pieces of fruit;
the driver includes:
an upper stop located on the side of the supply compartment, and arranged in such a way as to be able to come into contact with the piston on the side of the supply compartment when the valve is actuated in the discharge direction,
a lower stop located on the side of the metering compartment, and arranged in such a way as to be able to come into contact with the piston on the side of the metering compartment when the valve is actuated according to the transfer direction,
a connection portion that connects between them these lower and upper stops, and passing through the through-hole;
this allows for an easy realisation of the driving of the piston by the valve, or according to an alternative embodiment of the driving of the valve by the piston, in one direction and in the other, along the length of the cylinder body;
the upper stop is arranged in such a way as to close the passage, in particular the through-hole, when it comes into contact with the piston; as such the starting of the movement of the piston for the discharge is concomitant with the closing of the passage;
the upper stop has a tapered shape able to come into contact with the edges of the through-hole; this allows for an adjustment of the closing to the edges of the through-hole;

the edges of the through-hole on the supply compartment side form a tapered seat with a shape that is complementary to the upper stop; the adjustment is as such improved;

the connection portion includes a passage in the valve, with the latter being arranged in such a way that on the one hand when the lower stop is against the piston, the passage in the valve communicates on one side with the supply compartment via a space between the two stops, and on the other side with the metering compartment, and on the other hand when the upper stop is against the piston, the connection portion is isolated from the supply compartment by the upper stop; as such in this latter situation the passage in the valve no longer communicates with the supply compartment;

the connection portion includes a passage with an inlet opening and an outlet opening located on either side of the lower stop, with the inlet opening being located between the upper stop and the lower stop, with the valve being arranged in such a way that when the lower stop is in contact with the piston, the inlet opening opens into the supply compartment; as such when the upper stop is in contact with the piston, the inlet opening is not accessible, since it is below the closing of the through-hole by the upper stop; on the other hand when the lower stop is in contact with the valve, this inlet opening is accessible in the supply compartment; in this latter situation, the product can circulate from one compartment to the other by the passage inside the connection portion; this allows for a simpler arrangement of the valve through the through-hole of the piston; in addition this makes it possible to simplify the realisation of the piston, by adding the calibration of the duct that allows for the passage from one compartment to the other onto the passage contained in the connection portion;

the connection portion is cylindrical, in particular according to a longitudinal axis parallel to the longitudinal axis of the cylinder body, in particular coaxial with the latter; this makes it possible to simply realize this connection portion;

the passage in the connection portion can include a longitudinal duct and a transverse duct, with the longitudinal duct opening on one side by the outlet opening and on the other side being connected to a side of the transverse duct, with the other side of the transverse duct opening by the inlet opening; the transverse duct is referred to as transversal as it is not parallel with the longitudinal duct; the longitudinal duct is in particular parallel to the longitudinal axis of the cylinder body;

the passage in the connection portion includes a second inlet opening located between the upper stop and the lower stop, the valve being arranged in such a way that when the lower stop is in contact with the piston, the second inlet opening opens into the supply compartment, with the connection portion including a second transverse duct that opens on one side by this second inlet opening and being connected on the other side to the longitudinal duct; this makes it possible to further facilitate the transfer of the product into the metering compartment;

the two transverse ducts and the longitudinal duct are joined together in a "Y" shaped junction; this is a simple and more effective form of realisation as it allows for the arrival of the product in the passage in the connection portion on either side of the latter;

the longitudinal duct and the transverse duct or ducts are cylindrical and have circular sections of identical diameters; this allows for a more fluid flow of the product to the metering compartment;

the diameter of the transverse and longitudinal ducts is equal to the distance from the upper stop to the wall of the cylinder body in a transverse plan that passes through the location that is the widest transversally of the upper stop; as such that width available for the path of the product on the valve and on the piston is constant from the upper stop to the outlet of the passage through the connection portion;

the through-hole is centred on the piston and possibly the connection portion includes two transverse ducts as described above; such a realisation allows for a better distribution around the through-hole; in this case, according to an embodiment, the diameter of the transverse and longitudinal ducts can be close to a third of the value of the diameter of the cylinder body;

if the gap, referred to as upper stop gap, is considered between the diameter of the upper stop on its widest point and the diameter of the ducts, the diameter of the ducts is equal to one third of the difference between the diameter of the cylinder body and this upper stop gap;

the through-hole is offset on the piston; in other terms the centre of the through-hole is offset in relation to the centre of the piston; it is possible to no longer have but a single transverse duct; in this case, according to an embodiment, the diameter of the transverse and longitudinal ducts can be greater than one third of the value of the diameter of the cylinder body, and approach half of the diameter of the cylinder body; it is therefore possible to pass a product containing larger pieces;

in the case of the preceding paragraph, if the gap, referred to as upper stop gap, is considered between the diameter of the upper stop on its widest point and the diameter of the ducts, the diameter of the ducts is equal to half of the difference between the diameter of the cylinder body and this upper stop gap;

the connection portion is formed as a single piece with the lower stop; this allows for a simple realization of this portion of the valve;

the valve includes a closing part that includes the upper stop, the closing part also including a mechanism of fastening the connection portion to this closing part; this makes it possible to realize the valve simply; this is all the more so interesting according to an embodiment where the upper stop and the lower stop are tapered, with each stop pressing against the entire periphery of the edge of the through-hole located on the side of the corresponding stop;

the valve includes an annular seal between the connection portion and the closing part, arranged in such a way as to provide the seal around the mechanism of fastening;

the valve and the connection portion are fastened to one another by laser welding; this is more hygienic;

the piston includes peripheral edges arranged in such a way that the movement of the piston is guided by the walls of the cylinder body; this makes it possible to simply realize the mechanism for guiding the piston; in particular the peripheral edges of the piston can be arranged in such a way that the movement of the piston is guided solely by the walls of the cylinder body, with this further simplifying the realization of the piston and of the mechanism for guiding thereof;

the metering device includes at least one seal arranged around the piston in such a way as to provide the seal between the piston and the walls of the cylinder body, and guiding devices between the piston and the inner walls of the cylinder body in order to position and guide the piston in order to provide the seal of the seal;

the piston is arranged in order to be substantially guided by the walls of the cylinder body; this realization is simpler to carry out;

the piston includes at least on the side of the supply compartment a zone in the shape of a funnel that narrows towards, in particular to, the inlet of the passage in the piston; this allows for a faster flow of the product to the inlet opening of the passage in the piston; this also allows for a reinforcing of hygiene, as the product can flow naturally;

the angle aperture of the funnel shape is arranged in such a way that according to a longitudinal section passing through the centre of the transverse duct of the connection portion, the shortest distance between the wall of the funnel shape and the upper portion of the transverse duct has the same value as the diameter of the longitudinal duct; this allows a piece to be guided from the funnel shape to the passage of the valve, in order to pass through the latter during the movement thereof in the transfer direction;

the piston has an annular shape; the piston can for example be a solid of revolution, with the axis of revolution being in particular the longitudinal axis of the cylinder body; there is as such a very simple form, that can easily be obtained via moulding or by machining;

the device includes an actuating rod of the valve and the metering chamber includes an orifice for the passage of the actuating rod; this actuating rod can be the only actuating rod of the valve; there is as such a simple embodiment; more possibly or preferably, this rod can be the only actuating rod inside the metering chamber; in this latter case, the only critical sealing zone, as it is passed through by a mobile part that also passes through the product, is located on this passage of the actuating rod; the seal and the hygiene are therefore improved; the cleaning of the device is also simplified;

the metering chamber includes only three orifices that communicate with the outside of the metering chamber: a liquid intake orifice in the metering chamber, a liquid discharge orifice outside of the metering chamber and the orifice for passing an actuating rod of the valve; this metering chamber simplifies the seal of the chamber and the cleaning thereof;

the valve includes a magnetic material, and the movement mechanisms of the valve include mechanisms for generating a variation in a magnetic field arranged in such a way as to drive the movement of the magnet by variation in the magnetic field along the length of the cylinder body in such a way as to drive the movement of the valve; as such the cylinder body can be devoid of any actuating rod, and therefore also of an orifice passed through by such a rod; this makes it possible to further improve the seal and the hygiene of the device; the magnetic material can be for example an additional part or the material that forms a portion or the entire valve, for example the ring and/or the connection part;

the mechanisms for generating a variation in a magnetic field include a magnet outside of the metering chamber and movement mechanisms of this magnet along the length of the cylinder body, with the movement of this magnet driving the variation of the magnetic field allowing for the movement of the valve;

alternatively to the preceding paragraph, the mechanisms for generating a variation in a magnetic field include a linear motor generating a magnetic field, the linear motor being arranged along the length of the cylinder body, in particular around it, in order to directly drive the valve;

according to alternative embodiments of the three preceding paragraphs it is the piston that includes a magnetic material, with the mechanisms for generating a variation in a magnetic field driving the movement of the piston, which drives the movement of the valve via the driver, in particular the lower and upper stops;

the metering chamber includes only two orifices that communicate with the exterior of the metering chamber: an orifice for the intake of liquid into the metering chamber and an orifice for discharging the liquid outside of the metering chamber.

Some other embodiments are directed to a container filling machine that includes metering stations, with each metering station including a metering device as described above.

According to an embodiment, the filling machine includes a carrousel able to support containers, with the metering stations being distributed radially, the movement mechanisms of the valves of these metering stations including an electric motor to actuate the movement of the corresponding valve, with this machine being arranged in such a way that the filling of the containers can be done over a container travel that corresponds to an angular sector in relation to the axis of rotation of the carrousel greater than 180°, in particular greater than 270°.

This filling machine as such makes it possible to have a larger metering angle for each container between its arrival on the carrousel and its departure from the latter, with the suction time of the product being carried out at the same time as the discharge time, then followed by a fast transfer time. As such, the rotation speed of the carrousel can be increased while still retaining the same filling duration per container. Therefore, this will make it possible to decrease the number of filling stations, while still retaining the same rate of the number of containers filled by this machine. The machine according to some embodiments therefore allows for gain in terms of the number of filling stations/rate of containers filled ratio with respect to a conventional filling machine with a ramp of roller bearings for actuating pistons.

BRIEF DESCRIPTION OF THE FIGURES

Other characteristics and advantages of some embodiments shall appear when reading the detailed description of non-limiting examples that follow, for the understanding of which reference will be made to the annexed drawings, among which.

DETAILED DESCRIPTION OF THE EMBODIMENTS

Figure 1:
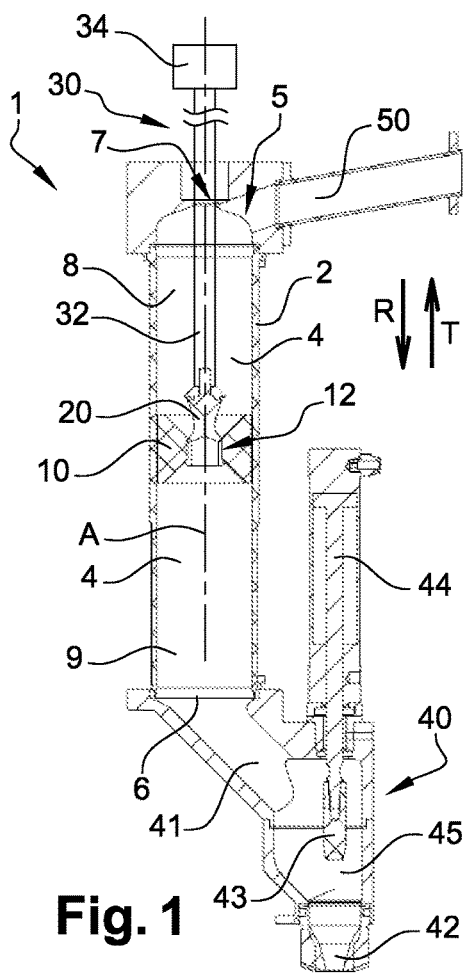
FIG. 1 is a longitudinal vertical cross-section of a metering device according to some embodiments according to a first embodiment.

According to a first embodiment, the metering device 1 includes a metering chamber 4, of which the volume is delimited by the wall of a cylinder body 2. This cylinder body admits a longitudinal axis A, extending according to the length of this cylinder body 2; in particular, it corresponds to the axis of the cylinder defined by the lateral inner walls of the cylinder body 2.

This metering chamber 4 includes an intake orifice 5 connected by a duct 50 to a tank (not shown). At the other end of the cylinder body 2, the metering chamber includes a discharge orifice 6 connected to a nozzle 40.

Inside the metering chamber 4, a piston 10 separates this metering chamber into two compartments:
  a supply compartment 8 above the piston 10 and wherein opens the intake orifice 5, and
  a metering compartment 9 below the piston 10 and from which opens the discharge orifice 6.

This piston 10 includes a passage 12, formed for example by a through-hole, connecting the supply compartment 8 to the metering compartment 9.

Figure 2:
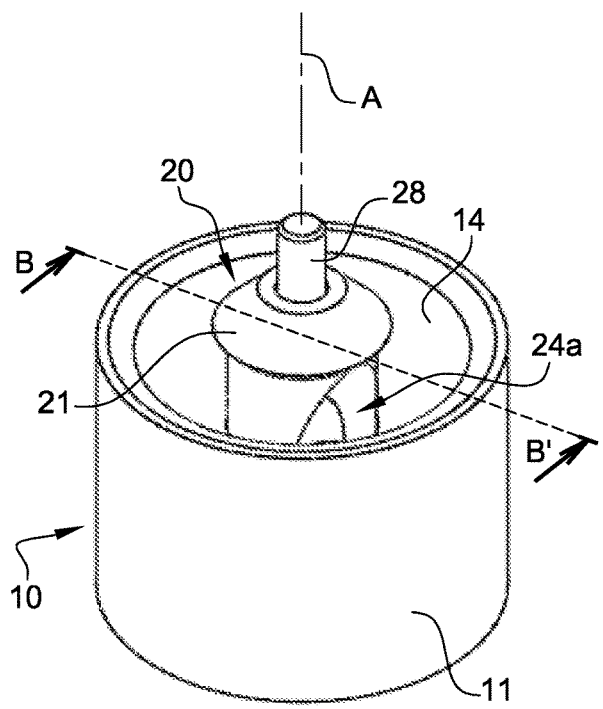
FIG. 2 is a perspective top view of a piston and of a valve of the device of FIG. 1 or 4.

This passage 12 in the piston 10 is able to be closed off by a valve 20, included in the metering chamber 4. For this, movement mechanisms 30 of the valve 20 make it possible to move the latter between an open position, shown in FIGS. 2 and 3a, and a closed position, shown in FIG. 3b.

Figure 3A:
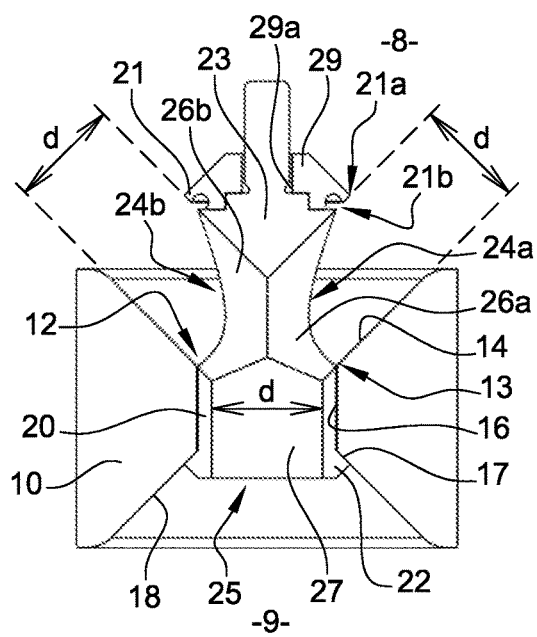
FIG. 3a is a longitudinal vertical cross-section of FIG. 2 according to a plane passing through the axis BB' and through the longitudinal axis A, with the valve in the open position.
Figure 3B:
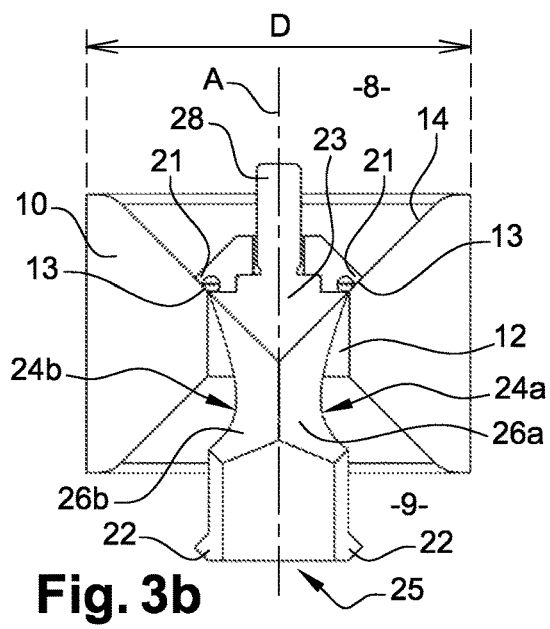
FIG. 3b corresponds to the cross-section of FIG. 3a but with the valve in the closed position.

This valve 20 includes drivers of the piston 10. As can be seen in FIGS. 3a and 3b and as details will be provided hereinafter, these drivers of the piston are distributed on either side of the piston 10 with an arrangement according to which the movement of the valve 20 along the length of the cylinder body 2 in a discharge direction R, in particular according to the longitudinal axis A of the cylinder body 2, drives the movement of the piston 10 according to the discharge direction R. Likewise, this arrangement allows for the movement of the valve 20 along the length of the cylinder body 2 in a transfer direction T opposite the discharge direction R, drives the movement of the piston 10 according to the transfer direction T.

According to the example shown in FIG. 1, the movement mechanisms 30 of the valve 20 include a movement rod 32, of which one of the ends is fastened to the valve 20. This movement rod 32 is actuated by an actuating device 34 that includes an electric motor, diagrammatically shown in FIG. 1. This motor drives the movement of the movement rod 32, and therefore of the valve 20 in the discharge direction R or the transfer direction T.

The drivers of the piston are realized in this example by a lower stop 22 and an upper stop 21. These stops 21, 22, are for example of a tapered shape with a maximum diameter greater than the diameter of the through-hole that forms the passage 12 in the piston 10.

For this, and as shown, the valve includes a connection portion 23 that connects these two stops 21, 22. The connection portion 23 passes through the passage 12 of the piston 10, in such a way that the upper stop 21 is in the supply compartment 8 and the lower stop 22 is in the metering compartment 9.

The connection portion 23 has itself a passage, that when the valve 20 is in the open position, as in FIG. 3a, opens on one side into the supply compartment 8 and on the other side into the metering compartment 9.

In the example shown, this passage 12 in the connection portion 23 is formed by three ducts arranged in a "Y" shape, and, in this example cylindrical between their junctions and their openings. This is a longitudinal duct 27 and two transverse ducts 26a and 26b.

Each transverse duct 26a, 26b opens on one side into the supply compartment 8. The passage in the connection portion 23 therefore has two inlet openings:
  a first inlet opening 24a located between the upper stop 21 and the lower stop 22, and corresponding to an inlet opening of the first transverse duct 26a, and
  a second inlet opening 24b also located between the upper stop 21 and the lower stop 22, but opposite the first inlet opening 24a in relation to the connection portion 23; it corresponds to an inlet opening of the second transverse duct 26b.

The first transverse duct 26a and the second transverse duct 26b are joined together by their other side, and also join at the same location one of the ends of the longitudinal duct 27. The latter has at its other end an outlet opening 25, which opens below the lower stop 22.

Therefore, when the valve 20 is in the open position, the passage in the valve 20 forms a communication between the supply compartment 8 and the metering compartment 9.

On the other hand, when the valve 20 is in the closed position, the inlet openings 24a, 24b of the transverse ducts 26a, 26b, are underneath the edges 13 of the through-hole 12 located on the supply compartment 8 side. As such, in the closed position, wherein the upper stop 21 is in contact with the edges 13 of the through-hole 12, the inlet openings 24a and 24b, are inaccessible from the supply compartment 8.

In this example, at the top of the inlet openings 24a and 24b, the connection portion 23 has a circular section of which the diameter is close to that of the through-hole 12. Therefore, these openings 24a and 24b are no longer accessible and the passage in the valve is no longer accessible. Therefore, the passage 12 through the piston 10 is also closed by the valve 20.

According to an embodiment, the edges 13 of the through-hole 12 on the supply compartment 8 side are of a shape that is complementary with the tapered shape of the upper stop 21. As such in the closed position, these edges 13 form a seat whereon the upper stop 21 bears, closing in a sealed manner the passage 12 through the piston 10.

The portion of the connection portion 23 located between the inlet openings 24a, 24b and the lower stop 22, is cylindrical and its diameter is possibly or preferably adjusted to that of the through-hole 12, while still leaving a gap in order to allow for the sliding of the connection portion 23 in the through-hole 12. This makes it possible to maximise the width of the passage for the product through the connection portion 23.

The lower stop 22 can also have a tapered shape oriented towards the piston 10. The edges 17 of the through-hole 12, on the metering compartment 9 side, can also have a shape that is complementary with this tapered shape, and as such form a seat for the upper stop 22. This improves the seal between the connection portion 23 and the inner cylindrical wall 16 of the through-hole 12.

As can be seen from these Figures, when the electric motor of the actuating device 34 actuates the movement rod 32 in descent, i.e. in the so-called discharge direction R, the valve 20 also descends. In a first step, the connection portion 23 slides in the through-hole 12, until the upper stop 21 bears in an adjusted manner with the seat formed by the edges 13 of the through-hole 12 on the supply chamber 8 side. The valve 20 is then in the closed position. The supply 8 and discharge 9 compartments are then separated in a sealed manner.

The precision of the metering can also be improved by adding an O-ring seal (not shown) on the lateral peripheral wall 11 of the piston facing the inner wall of the cylinder body 2. Indeed, by preventing leakage of the product between the peripheral wall 11 and the inner wall of the cylinder body 2, this allows for the quantity of product that reaches the container to be filled to correspond to the volume of product moved in the metering chamber 4 over the length of movement of the piston 10 in this chamber.

Then in a second step, during the descent of the movement rod 32, the valve remains in the closed position, the upper stop 21 pressed against the piston 10, and drives in movement the piston 10 downwards. Therefore, the volume of the supply compartment 8 is increased and the product present in the tank (not shown) is sucked through the duct 50, to the supply compartment 8. At the same time, the movement of the piston 10 downwards drives the discharge of the product present in the metering compartment 9 outside of the metering chamber 4, by the outlet 6, where the product enters into a first channel 41 of a nozzle 40.

This nozzle 40 includes a spout 42 intended to be arranged above the container to be filled. Between the first channel 41 and this spout 42, the nozzle includes a housing 45 where the metered product arrives and inside of which a sealing off part 43 is moved in order to close or open the spout 42. This sealing off part 43 can be driven in different ways, in particular by a cylinder 44. During the discharge of the product, this sealing off part is released from the spout 42 so as to allow for the outlet of the product via the nozzle 40.

The volume of product metered corresponds to the volume of the portion of the cylinder body 2 along which the piston 10 is moved.

The electric motor can be programmed for a length of a given travel of the piston 10, corresponding to a given volume. Several containers can for example be filled by moving the piston in the same discharge direction R. The movement of the piston is just stopped and the spout 32 closed off, the time for another container to be brought under the spout 32. The spout is then once again open and the descent of the piston 10 continues.

Once the entire quantity of product desired is discharged, the electric motor 34 actuates the movement of the movement rod 32, in the opposite direction, i.e. in the transfer direction T. At this instant, as the suction has taken place at the same time as the discharge, the supply compartment 8 is filled with product. Possibly or preferably, the sealing off part 43 is moved in such a way as to close the spout 42.

In a first step, the connection portion 23 slides in the through-hole 12 of the piston 10 in the transfer direction T, until the lower stop 22 bears in an adjusted manner with the seat formed by the edges 17 of the through-hole on the metering compartment 9 side. The valve 20 is then in the open position. The supply 8 and metering 9 compartments then communicate between them.

Then in a second step, during the rising of the movement rod 32, the valve 20 remains in open position, the lower stop 22 pressed against the piston 10, and drives in movement the piston 10 upwards. As such, during the movement of the piston, the product present in the supply compartment 8 passes through the piston 10 via the passage 26a, 26b, 27, in the connection portion 23, until in the metering compartment 9.

When the piston is raised, the product has been transferred from the supply compartment 8 to the metering compartment 9. It is again possible to fill other containers, as described hereinabove.

As such the valve not only allows for the closing and the opening but also the actuating of the piston. A single actuator may therefore be required for these functions.

Moreover, the piston is of a simple shape to realize.

The device is also easy to clean. For example, while actuating the valve 20 according to the back-and-forth movements through the passage 12 of the piston 10, it is possible to send water under pressure, for example via the intake duct 50. The water then passes through the ducts 26a, 26b and 27 and from one compartment 8, 9, to the other. It is as such possible to easily clean the walls of the cylinder body 2, the piston 10 and its passage 12, the entire valve 20 and its transversal 26a, 26b and longitudinal 27 ducts. The simple shape of the piston 10, the "Y" arrangement of the ducts 26a, 26b and 27, and the tapered shape of the stops 21, 22, also facilitate this cleaning.

In addition, as can be seen in FIG. 1, a single actuating rod passes through the walls of the metering chamber 4: the movement rod 32 of the valve 20. This rod 32, passes through the walls of the metering chamber 4 at the top of the latter via a passage orifice 7, including more possibly or preferably a seal (not shown). As such, the metering chamber 4 only includes three orifices: the intake orifice 5, the discharge orifice 6 and the passage orifice of the movement rod 32. As such, this metering device 1 is easier to manage in terms of the seal and hygiene.

In addition, the rods that soak in the product to be metered and slide through the walls of the metering chamber are critical points in terms of hygiene. According to some embodiments, and in particular according to this example, only the movement rod 32 passes through the walls of the metering chamber 4, which further improves the hygiene of the metering device 1.

In order to improve the use of this device with regards to the product including pieces, such as yoghurts with pieces of fruit, the transverse ducts 26a, 26b and the longitudinal duct 27, can have cylindrical portions with an equal diameter d.

In addition, the piston 10 has, in the example shown, the shape of a funnel 14 that narrows towards the bottom, therefore towards the through-hole 12, and therefore also towards the inlet openings 24a and 24b when the valve 20 is in the open position. Therefore, during the rising of the piston 10, the pieces are guided to the inlet openings 24a and 24b. This funnel shape 14 can be tapered, with for example a cone axis coaxial with the longitudinal axis A of the cylinder body 2 and with that of the longitudinal duct 27.

In the embodiment shown, the transverse distance, either orthogonal to the longitudinal axis A, of the widest point 21a of the upper stop 21, or its location that is closest to the inner wall of the cylinder body 2, is equal to the diameters d of the transverse ducts 26a, 26b and of the longitudinal duct 27. The possible space for the passage of pieces is as such used to the maximum. This passage can for example be close to a third of the diameter D of the cylinder body 2. Indeed, if the gap between the diameter of the upper stop 21 on its widest point 21a and the diameter d of the ducts 26a, 26b, 27, referred to as upper stop gap 21, is considered the diameter of the ducts is equal to approximately one third of the difference between the diameter D of the cylinder body and this upper stop gap 21.

As can be seen in FIGS. 1 to 3b, the piston 10 is of a simple shape. It includes a toric part with an axis corresponding to the longitudinal axis A, forming a cylindrical peripheral wall 11 over most of its lateral surface. This peripheral wall 11 surrounds two funnel shapes 14 and 18, decreasing towards one another and being joined by a cylindrical through-hole, forming the passage 12 in the piston 10.

Also the valve 20 is realized in a simple manner. It includes according to some embodiments, in particular in this example, two single-piece parts. The first single-piece part is formed by the connection portion 23 and the lower stop 22. It carries a threaded rod 28. The second single-piece part includes the upper stop 21 and can, for example, be a ring 29 screwed onto the threaded rod 28, with the tapped central hole 29a of the ring forming the mechanism of fastening to the connection portion 23.

The threaded rod 28 can be arranged to partially pass through the ring 29. Therefore, the free end of this threaded rod 28 is available to be screwed into a corresponding housing of the movement rod 32.

According to an alternative embodiment, the central hole 29a of the ring 29, does not include any tapping, but smooth walls. The ring 29 is then simply threaded onto the threaded rod 28 and it is the screwing of the movement rod 32 of the valve 20 onto the threaded rod 28 which will make it possible to trap the ring 29 between the corresponding end of the movement rod 32 and the connection portion 23.

Other than on transverse ducts 26a, 26b, and the threading of the threaded rod 28, this first single-piece part can be a solid of revolution, with here an axis of revolution coaxial with the longitudinal axis A.

Likewise other than the inner threading of the ring 29, when the latter includes one, this ring can also be a solid of revolution, with here an axis of revolution coaxial with the longitudinal axis A.

In order to prevent any risk of contamination by the product on the threaded rod 28, the ring 29 can include a flute 21b on the junction of this ring 29 and of the first single-piece part, arranged to receive an O-ring seal (not shown). The single-piece parts are arranged to pinch this seal when the ring 29 is fully screwed on the threaded rod 28 or trapped between the movement rod 32 and the connection portion 23.

Figure 4:
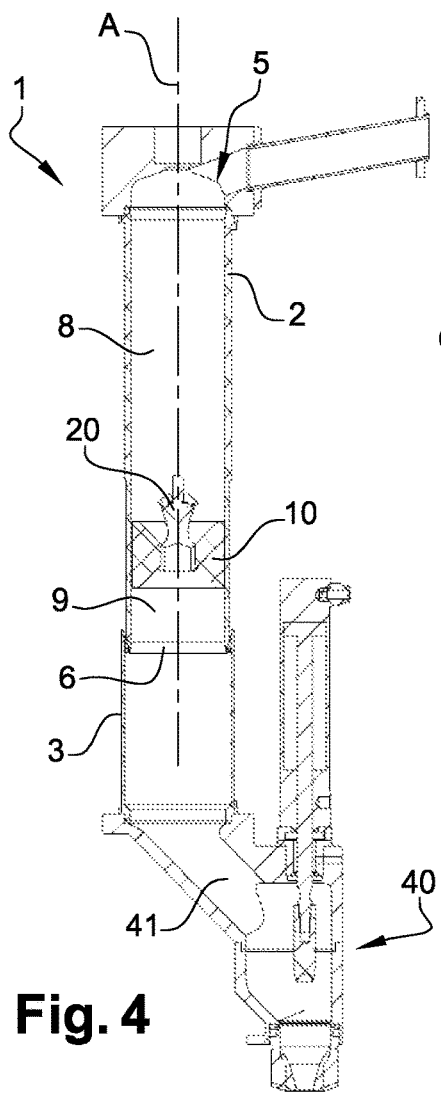
FIG. 4 is a longitudinal vertical cross-section of a metering device according to the first embodiment, according to an alternative embodiment in relation to FIG. 1, with a sleeve forming a cleaning chamber, mounted between the metering chamber and the nozzle.

FIG. 4, still shows the metering device 1 of FIG. 1, but in a different mounting. Indeed, in FIG. 4, the metering device 1 includes a sleeve 3, which has been mounted between the outlet orifice 6 of the cylinder body 2 and the nozzle 40. This sleeve 3, which is globally cylindrical, is in the extension of the cylinder body 2 and therefore it defines with the latter a cleaning chamber 3a. The inner diameter of this sleeve 3 is slightly greater than the diameter of the cylinder body 2. As such, the piston 10 can be positioned in the cleaning chamber 3a and clean the cylindrical peripheral wall 11 of the piston.

In addition, this mounting is easier in that according to some embodiments, it is the valve 20 that actuates the piston 10.

Note that according to an alternative embodiment, the sleeve 3 could be mounted between the top end of the cylinder body 2 and the intake orifice 5, instead of being mounted at the bottom as in FIG. 4.

In FIG. 4, the movement mechanisms 32 of the valve 20 were not shown for reasons of clarity. In this example, this can however be the same as those of FIG. 1.

Figure 5:
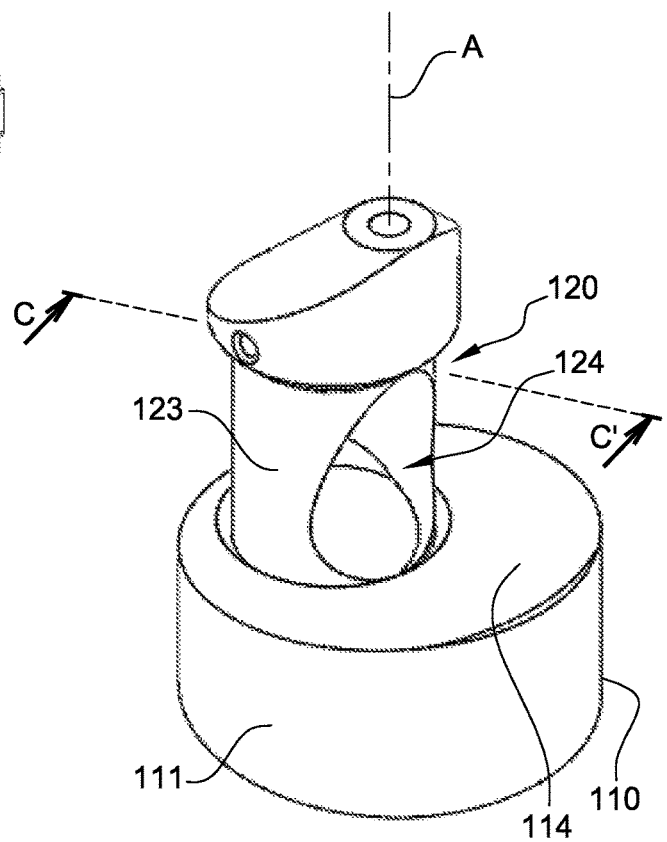
FIG. 5 is a perspective top view of a piston and of a valve according to a second embodiment of a metering device.
Figure 6A:
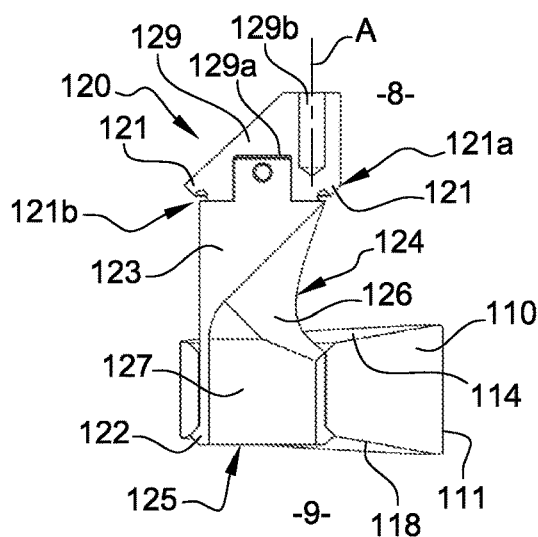
FIG. 6a is a longitudinal vertical cross-section of FIG. 5 according to a plane passing through the axis CC' and through the longitudinal axis A, with the valve in the open position.
Figure 6B:
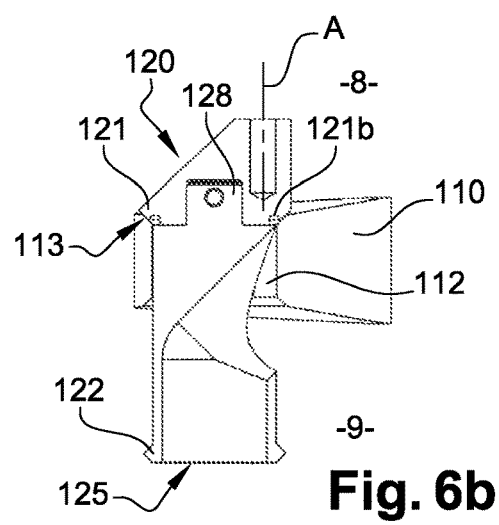
FIG. 6b corresponds to the cross-section of FIG. 6a but with the valve in the closed position.

FIGS. 5 to 6b show a second embodiment with a piston 110 and a valve 120 that are different. They are arranged in such a way as to pass pieces that are larger than the piston 10 and the valve 20 of the first embodiment.

The valve 120 and the piston 110 can be adapted in the metering device 1 in place of the valve 20 and of the piston 10 described hereinabove. They will therefore not be shown again placed in the cylinder body 2. Likewise, the cooperation of the piston 110 and of the cylinder body will not be shown in detail as hereinabove. The piston 110 here also provides the separation of the metering chamber into two compartments, the supply compartment 8 and the metering compartment 9.

However in this second embodiment, the passage 112 in the piston is offset. In particular in this example, the passage 112 is a cylindrical through-hole of which the axis is offset in relation to the centre of the piston 110, and therefore in relation to the longitudinal axis A of the cylinder body.

The piston 110 of this embodiment also has a funnel shape 114 of the supply compartment 8, which narrows towards this through-hole 112. This funnel shape 114 is also arranged so that during the movement of the valve 120 according to the transfer direction, the product and its pieces are guided towards the through-hole 112.

On the side of the metering compartment 9, the piston can also include a funnel shape 118 that narrows towards the through-hole 112.

The valve 120 also includes upper 121 and lower 122 stops, located on either side of the through-hole 112, in order to cooperate with shapes that are complementary with the piston 110 and drive the latter in movement in the same way as in the first embodiment.

These stops 121 and 122 can be tapered and/or cooperate with the edges 113, 117 of the through-hole.

The valve also includes a connection portion 123 between these stops 121 and 122. However the connection portion 123 differs from that of the first embodiment in that it includes only one transverse duct 126, opening into the supply compartment 8 via a single inlet opening 124. The other end of the transverse duct 126 is joined to a longitudinal duct 127, which opens into the metering compartment 9, via an outlet opening 125.

As in the first embodiment, the open position of the valve 120, shown in FIG. 6a, corresponds to the position wherein the valve 120 is able to drive the piston 110 in movement in the transfer direction, i.e. upwards, with the product then passing from the supply compartment 8 to the metering compartment 9. The closed position of the valve 120, shown in FIG. 6b, corresponds to the position wherein the valve 120 is able to drive the piston 110 in movement in the discharge direction, i.e. downwards, with the product in the metering compartment 9 then being discharged to the nozzle, at the same time as the product is sucked into the supply compartment 8.

The longitudinal duct 127 and the transverse duct 126 therefore form an angle between them. The transverse duct 126 is arranged in such a way that the inlet opening 124 is located on the side of the piston where the distance between the peripheral wall 111 of the piston 110 and the through-hole 112 is the highest. As such, this inlet opening is turned towards the widest space between the connection portion 123 and the cylinder body. This allows larger pieces to pass between the valve 120 and the walls of the cylinder body compared to the first embodiment.

In addition in order to optimise this advantage, the diameters of the transverse duct 126 and of the longitudinal duct 127 can be greater and approach nearly half of the diameter of the cylinder body.

Indeed, if the gap between the diameter of the upper stop 121 on its widest point 121a and the diameter of the ducts 126, 127, referred to as upper stop gap, is considered the diameter of the ducts will be equal to half of the difference between the diameter D of the cylinder body and this upper stop gap 121.

This embodiment therefore makes it possible with the same cylinder body to pass a product with larger pieces.

It is possible for example in the metering device shown in FIG. 1, to use a valve/piston unit according to the first or according to the second embodiment according to the product metered.

In this second embodiment, the valve 120 can also be in two single-piece parts. The first single-piece part is formed by the connection portion 123 and the lower stop 122. It can carry a threaded rod 128. The second single-piece part can be a ring 129 screwed onto the threaded rod 128.

The threaded rod 128 can in particular be solely intended for the fastening of the two single-piece parts and is offset in relation to the centre of the piston 112 but centred in relation to the axis of the longitudinal duct 127. Therefore, the ring 129 can have a first housing 129a, possibly or preferably non-through, having a tapping wherein the threaded rod 128 is screwed. The ring 129 can have in the same way as in the first embodiment, a flute 121b to receive an O-ring seal (not shown) which provides the seal between the two single-piece parts.

The ring 129 can have a second housing 129b with an inner tapping wherein the movement rod of the valve 120 is screwed. This second housing 129b is more possibly centred in relation to the longitudinal axis A of the cylinder body and therefore in relation to the centre of the piston 110.

Figure 7:
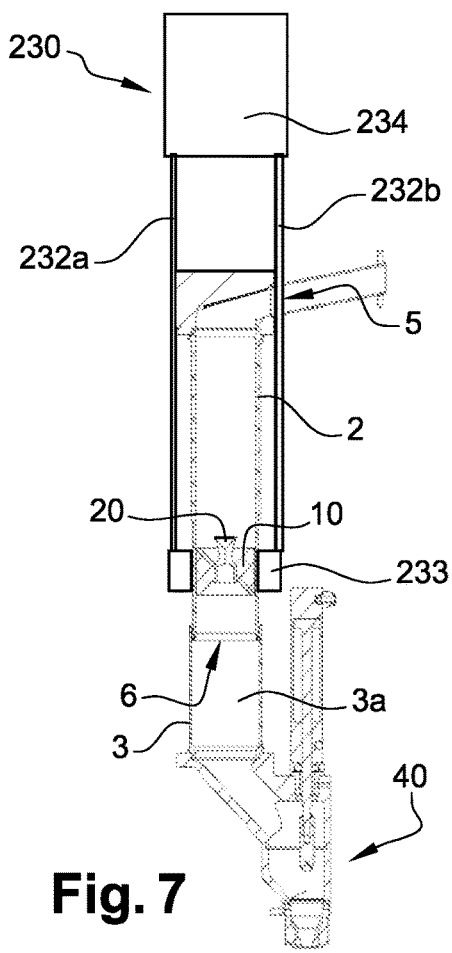
FIG. 7 discloses a third embodiment of which the movement mechanisms of the valve differ from the metering device shown in FIG. 4.
Figure 8:
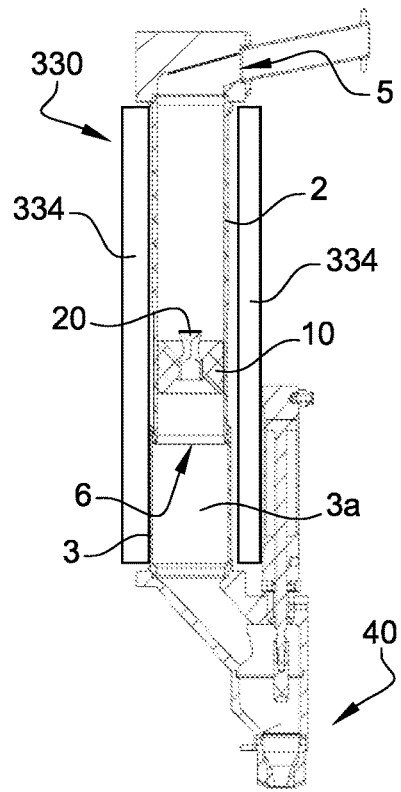
FIG. 8 discloses a fourth embodiment of which the movement mechanisms of the valve differ from the metering device shown in FIGS. 4 and 7.

In a third and a fourth embodiment shown respectively in FIG. 7 and in FIG. 8, the metering device differs from the one of the preceding embodiments by the movement mechanisms 230, 330, of the valve 20. Only the references of these movement mechanisms are therefore modified.

According to the third embodiment, the movement mechanisms 230 of the valve 20 include a movement magnet 233 housed outside the cylinder body 2. This movement magnet 233 can be annular and housed around the cylinder body 2, as in FIG. 3. The movement magnet 233 is driven by drivers along this cylinder body 2, in particular parallel to the longitudinal axis A of the cylinder body. Here, this entails movement rods 232a, 232b, located outside and along the length of the cylinder body 2. These movement rods 232a, 232b can be actuated by a motor 234.

The valve 20 includes a magnetic material. The magnet 233 and the magnetic material are arranged in such a way that the movement of the magnet 233 drives the movement of the valve 20 and therefore the movement of the piston 10. As such the magnet 233, the movement rods 232a, 232b, and the motor 234 forms mechanisms for generating a variation in a magnetic field along the length of the cylinder body 2 in such a way as to drive the movement of the valve 20.

The fourth embodiment also uses a valve 20 with a magnetic material moved by mechanisms for generating a variation in a magnetic field along the length of the cylinder body 2. However, in this fourth embodiment, the mechanisms for generating a variation in a magnetic field are formed by a linear electric motor 334, arranged around and along the length of the cylinder body 2. This linear electric motor 334 makers it possible to directly vary the magnetic field along the length of the cylinder body 2.

Alternatively, in alternatives of these third and fourth embodiments, the piston includes a magnetic material and it is the piston that opens and closes the valve during the movement thereof.

As such, in the third embodiment, as well as in the fourth embodiment, as well as according to their alternatives, there is no longer any movement rod in the metering chamber. The walls of the metering chamber are no longer passed through and the metering chamber can include only two orifices: the intake orifice 5 and the discharge orifice 6. These third and fourth embodiments, as well as their alternatives therefore perform better in terms of hygiene.

In addition, the valves, whether or not offset, in particular the rings carrying the upper stop, are simpler to realize as they no longer need any mechanisms of fastening to a movement rod.

Figure 9:
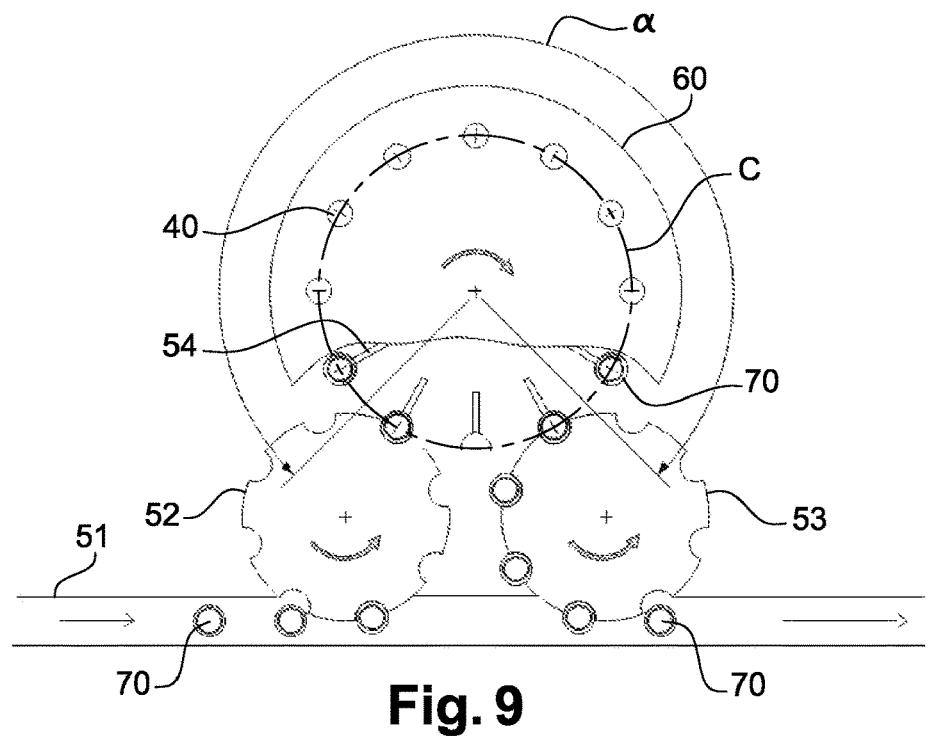
FIG. 9 shows a filling machine for a device according to some embodiments.

FIG. 9 shows a filling machine according to some embodiments that includes a carrousel 60 able to support containers 70, via support mechanism 54. The metering stations are radially distributed and each include a metering device according to some embodiments. With a concern for clarity, only the locations of the spouts of the nozzles 40 of the metering devices are shown. All or most of these spouts are arranged according to a circle C centred on the axis of rotation Z of the carrousel 60.

The movement mechanisms of the valves of these metering devices include an electric motor, in order to actuate the movement of the corresponding valve, according to one of the embodiments described hereinabove.

A system for bringing containers 70 to be filled, known per se, such as a conveyor belt 51 combined with a rotating transfer conveyor, here a first transfer star 52, that makes it possible to laterally engage the containers 70 between the clamps of the support mechanism 54, and a removal system, including a second transfer star 53 combined for example with a downstream portion of the aforementioned conveyor belt 51, making it possible to laterally remove the filled containers.

Once supported on the carrousel 60, the containers will carry out a container travel, all or most along which they will be filled by the corresponding nozzle. This travel corresponds to an angular sector α, with this angular sector being defined in relation to the axis of rotation Z of the carrousel 60.

Due the use of simple movement mechanisms of the valve and of the piston, in particular of an electric motor, this angular sector α can be greater than 180°, in particular greater than 270°, for example up to 288°. In this example, it is 270°.

For example, if a conventional carrousel with a container travel with 20 metering stations, rotating at 10 rpm, is considered, a rate of 200 contained filled per minute is obtained. On a conventional carrousel, the travel of containers is done on an angular sector of 180°.

With a machine according to some embodiments and according to the example shown, the metering stations can be arranged as shown in such a way that the filling is done over a container travel that corresponds to an angular sector α of 270°. As such, it is possible to increase the rotation speed of the carrousel 60 to 15 rpm, while still retaining the same filling duration along a longer container travel.

Therefore, with only fourteen metering devices, a rate of 210 containers 70 filled per minute is obtained, i.e. 210 containers 70 per minute passing from the carrousel 60 to the second transfer star 53.

This machine as such allows for a gain in terms of the number of filling stations/rate of containers filled ratio with respect to a related art filling machine.

The invention claimed is:

1. A metering device for a machine for filling containers with
   a product, comprising:
   a cylinder body defining a metering chamber, configured to be filled with the product;
   a piston inside the metering chamber and separating the metering chamber into a supply compartment and a metering compartment, with the piston including a passage that communicates between the supply compartment and the metering compartment in such a way as to allow passage of the product between the supply compartment and the metering compartment;
   a valve for closing the passage; and
   a mover that facilitates movement of the valve or of the piston along the length of the cylinder body, wherein the valve includes a driver arranged on either side of the piston in such a way that the movement respectively of the valve or of the piston along the length of the cylinder body in a discharge direction drives the movement respectively of the piston or of the valve in the discharge direction and the movement respectively of the valve or of the piston along the length of the cylinder body in a transfer direction opposite the discharge direction, drives the movement respectively of the piston or of the valve in the transfer direction,
   wherein the passage is a through-hole,
   wherein the driver includes:
      an upper stop located on a side of the supply compartment, and arranged in such a way as to be able to come into contact with the piston on the side of the supply compartment when the valve is actuated in the discharge direction,
      a lower stop located on a side of the metering compartment, and arranged in such a way as to be able to come into contact with the piston on the side of the metering compartment when the valve is actuated according to the transfer direction, and
      a connection portion that connects the lower and upper stops, and passing through the through-hole,
   wherein the connection portion includes a passage with an inlet opening and an outlet opening located on either side of the lower stop, with the inlet opening being located between the upper stop and the lower stop, with the valve being arranged in such a way that when the lower stop is in contact with the piston, the inlet opening opens into the supply compartment, and
   wherein the passage in the connection portion includes a longitudinal duct and a transverse duct, the longitudinal duct opening on one side by the outlet opening and on an other side, of the longitudinal duct, being connected to a side of the transverse duct, with an other side of the transverse duct opening by the inlet opening;
   wherein the piston includes at least on the side of the supply compartment, a zone in the shape of a funnel that narrows towards the inlet of the passage in the piston; and wherein the transverse duct includes an outer surface aligned with a surface of the zone, of the piston, and such outer surface is in the shape of the funnel.

2. The metering device according to claim 1, wherein the upper stop is arranged in such a way as to close the through-hole when the upper stop contacts with the piston.

3. The metering device according to claim 1, wherein the passage in the connection portion includes a second inlet opening located between the upper stop and the lower stop, the valve being arranged in such a way that when the lower stop is in contact with the piston, the second inlet opening opens into the supply compartment, with the connection portion including a second transverse duct that opens on one side by the second inlet opening and being connected on the other side to the longitudinal duct, the through-hole being centred on the piston, with the diameter (d) of the transverse and longitudinal ducts being close to a third of the value of the diameter (D) of the cylinder body; and
   wherein the longitudinal duct, the transverse duct, and the second transverse duct constituting three ducts, and such three ducts arranged in a "Y" shape.

4. The metering device according to claim 1, wherein the through-hole is offset on the piston.

5. The metering device according to claim 1, wherein the connection portion is formed as a single piece with the lower stop, and wherein the valve includes a closing part that includes the upper stop, the closing part also includes a fastener that fastens the connection portion to the closing part.

6. The metering device according to claim 1, wherein the metering chamber includes only three orifices that communicate with the outside of the metering chamber: a liquid intake orifice in the metering chamber, a liquid discharge orifice outside the metering chamber and a passage orifice of an actuating rod of the valve.

7. The metering device according to claim 1, wherein the valve includes a magnetic material, and wherein the mover of the valve includes a magnetic field varier for varying a magnetic field arranged in such a way as to drive a movement of the magnetic material by variation in the magnetic field along the length of the cylinder body in such a way as to drive the movement of the valve.

8. The metering device according to claim 1, wherein the valve includes a magnetic material, a generator for generating a variation in a magnetic field along the length of the cylinder body driving the movement of the piston, which drives the movement of the valve via the driver.

9. The metering device according to claim 8, wherein the generator for generating a variation in a magnetic field includes a magnet outside of the metering chamber and a mover of the magnet along the length of the cylinder body, with the movement of this magnet driving the variation of the magnetic field allowing for the movement of the valve.

10. The metering device according to claim 7, wherein the cylinder body is devoid of any actuating rod, and therefore also of an orifice passed through by such a rod.

11. A machine for filling containers comprising:
    multiple metering stations, each metering station including the metering device according to claim 1; and
    a carrousel configured to support the containers, with the metering stations being distributed radially, the mover of the valves of the metering stations including an electric motor to actuate the movement of the corresponding valve, with this machine being arranged in such a way that the filling of the containers can be performed over a container travel that corresponds to an angular sector (α) in relation to the axis of rotation (Z) of the carrousel greater than 270°.

12. The metering device according to claim 2, wherein the connection portion is formed as a single piece with the lower stop, and wherein the valve includes a closing part that includes the upper stop, the closing part also includes a fastener that fastens the connection portion to the closing part.

13. The metering device according to claim 1, wherein the connection portion is formed as a single piece with the lower stop, and wherein the valve includes a closing part that includes the upper stop, the closing part also includes a fastener that fastens the connection portion to the closing part.

14. The metering device according to claim 1, wherein the connection portion is formed as a single piece with the lower stop, and wherein the valve includes a closing part that includes the upper stop, the closing part also includes a fastener that fastens the connection portion to the closing part.

15. A metering device for a machine for filling containers with a product, comprising:
   a cylinder body defining a metering chamber, configured to be filled with the product;
   a piston inside the metering chamber and separating the metering chamber into a supply compartment and a metering compartment, with the piston including a passage that communicates between the supply compartment and the metering compartment in such a way as to allow passage of the product between the supply compartment and the metering compartment;
   a valve for closing the passage; and
   a mover that facilitates movement of the valve or of the piston along the length of the cylinder body, wherein the valve includes a driver arranged on either side of the piston in such a way that the movement respectively of the valve or of the piston along the length of the cylinder body in a discharge direction drives the movement respectively of the piston or of the valve in the discharge direction and the movement respectively of the valve or of the piston along the length of the cylinder body in a transfer direction opposite the discharge direction, drives the movement respectively of the piston or of the valve in the transfer direction,
   wherein the passage is a through-hole,
   wherein the driver includes:
      an upper stop located on a side of the supply compartment, and arranged in such a way as to be able to come into contact with the piston on the side of the supply compartment when the valve is actuated in the discharge direction,
      a lower stop located on a side of the metering compartment, and arranged in such a way as to be able to come into contact with the piston on the side of the metering compartment when the valve is actuated according to the transfer direction, and
      a connection portion that connects the lower and upper stops, and passing through the through-hole,
   wherein the connection portion includes a passage with an inlet opening and an outlet opening located on either side of the lower stop, with the inlet opening being located between the upper stop and the lower stop, with the valve being arranged in such a way that when the lower stop is in contact with the piston, the inlet opening opens into the supply compartment, and
   wherein the passage in the connection portion includes a longitudinal duct and a transverse duct, the longitudinal duct opening on one side by the outlet opening and on an other side, of the longitudinal duct, being connected to a side of the transverse duct, with an other side of the transverse duct opening by the inlet opening; and
   wherein the transverse duct is arranged at an angle relative to the longitudinal duct, such that the transverse duct extends in both a longitudinal direction and a transverse direction, with the longitudinal duct extending along the longitudinal direction.

16. A metering device for a machine for filling containers with a product, comprising:
   a cylinder body defining a metering chamber, configured to be filled with the product;
   a piston inside the metering chamber and separating the metering chamber into a supply compartment and a metering compartment, with the piston including a passage that communicates between the supply compartment and the metering compartment in such a way as to allow passage of the product between the supply compartment and the metering compartment;
   a valve for closing the passage; and
   a mover that facilitates movement of the valve or of the piston along the length of the cylinder body, wherein the valve includes a driver arranged on either side of the piston in such a way that the movement respectively of the valve or of the piston along the length of the cylinder body in a discharge direction drives the movement respectively of the piston or of the valve in the discharge direction and the movement respectively of the valve or of the piston along the length of the cylinder body in a transfer direction opposite the discharge direction, drives the movement respectively of the piston or of the valve in the transfer direction,
   wherein the passage is a through-hole,
   wherein the driver includes:
      an upper stop located on a side of the supply compartment, and arranged in such a way as to be able to come into contact with the piston on the side of the supply compartment when the valve is actuated in the discharge direction,
      a lower stop located on a side of the metering compartment, and arranged in such a way as to be able to come into contact with the piston on the side of the metering compartment when the valve is actuated according to the transfer direction, and
      a connection portion that connects the lower and upper stops, and passing through the through-hole,
   wherein the connection portion includes a passage with an inlet opening and an outlet opening located on either side of the lower stop, with the inlet opening being located between the upper stop and the lower stop, with the valve being arranged in such a way that when the lower stop is in contact with the piston, the inlet opening opens into the supply compartment, and
   wherein the passage in the connection portion includes a longitudinal duct and a transverse duct, the longitudinal duct opening on one side by the outlet opening and on an other side, of the longitudinal duct, being connected to a side of the transverse duct, with an other side of the transverse duct opening by the inlet opening; and
   wherein the connection portion includes:
      a second inlet opening that opens into the supply compartment, and
      a second transverse duct that opens on one side, of the second transverse duct, by the second inlet opening and being connected on an other side, of the second transverse duct, to the longitudinal duct; and wherein the longitudinal duct, the transverse duct, and the second transverse duct constituting three ducts arranged in a "Y" shape.

* * * * *